G. G. FOX.
COOKER.
APPLICATION FILED APR. 21, 1909.
956,802.
Patented May 3, 1910.
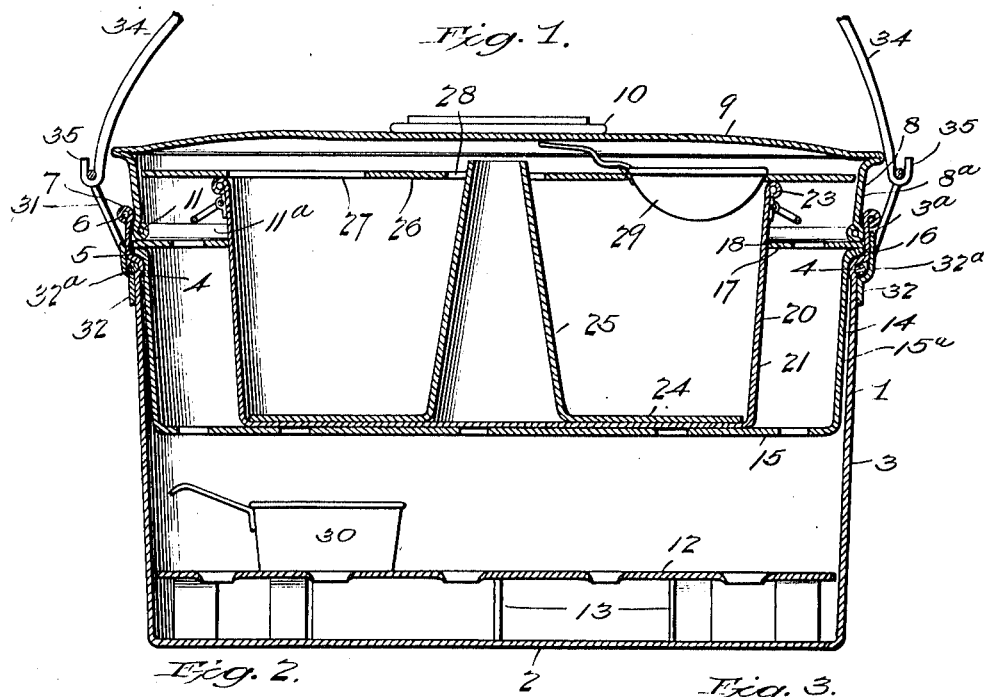
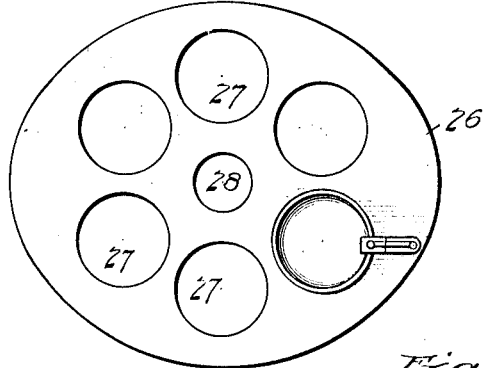
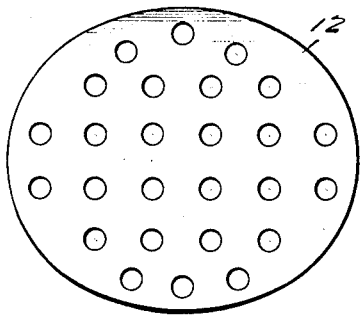
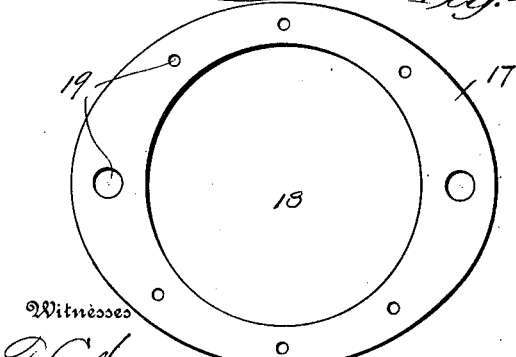
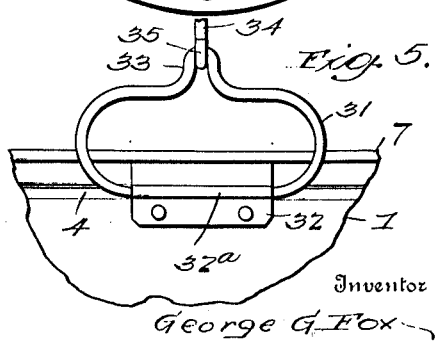
Inventor
George G. Fox
By E. E. Vrooman
his Attorney.
Witnesses

UNITED STATES PATENT OFFICE.

GEORGE G. FOX, OF KITTANNING, PENNSYLVANIA, ASSIGNOR OF ONE-FOURTH TO JESSE K. JOHNSTON, OF CHARLEROI, PENNSYLVANIA.

COOKER.

956,802.  Specification of Letters Patent.  Patented May 3, 1910.

Application filed April 21, 1909. Serial No. 491,361.

*To all whom it may concern:*

Be it known that I, GEORGE G. Fox, a citizen of the United States, residing at Kittanning, in the county of Armstrong and State of Pennsylvania, have invented certain new and useful Improvements in Cookers, of which the following is a specification, reference being had therein to the accompanying drawing.

This invention relates to improvements in cookers, and has for its object to provide a cooker, which comprises a number of utensils, the arrangement of which can be so varied as to permit a number of articles of food to be conveniently cooked at the same time.

Another object of my invention is to so shape and arrange the parts of the cooker that, when the same is not in use, the various parts thereof can be packed within the main receptacle and the cover be placed in position.

Other objects and advantages of my invention will appear in the course of the following specification.

In the accompanying drawing: Figure 1 is a vertical, sectional view through the cooker, showing the parts assembled therein; Fig. 2 is a top plan view of a disk arranged to support a plurality of cooking utensils; Fig. 3 is a top plan view of a disk adapted to be placed in the bottom of the cooker; Fig. 4 is a top plan view of a disk adapted to serve as a support for one of the utensils of the cooker; and Fig. 5 is a fragmentary view of one side of the cooker, showing the ear pivoted to the side of the cooker and the hooked end of the handle engaging the same.

Referring to the drawing, which illustrates the preferred form of my invention, (1) designates the main receptacle of the cooker. The receptacle (1) is oval in shape and provided with a flat bottom (2) from which the sides (3) slant slightly outwardly. Near the top of the receptacle is formed a circumferential groove (4), which forms on the inside of said receptacle a projection or ledge (5) above which the sides as at 3ª slant slightly inward, as shown. The top of the sides is rolled or turned over outwardly on a piece of wire (6) to form a strengthened rim (7).

Adapted to fit into the top of the receptacle (1) is a cover (8) provided with a slightly outwardly curved top (9) to the center of which is secured a handle (10). The sides (8ª) of the cover have their lower edges turned over a wire (11) to form a bead (11ª). By means of this construction, the cover may be pushed down into the top of the receptacle, and will be held in place by friction, the sides of the cover with the beaded edge being squeezed into the inwardly slanting sides of the top of the receptacle.

A slightly oval perforated disk (12), shown in Fig. 3, has secured upon its under side short standards or legs (13). As shown in Fig. 1, the standards are adapted to rest on the bottom of the receptacle 1. The object of this arrangement is that articles of food, such as meat, etc., can be placed on the disk (12), and be cooked with the advantage of being subjected all the time to the moisture of the rising steam.

A deep pan (14) formed with a perforated bottom (15) and slanting sides (15ª), which terminate at the top in an out-turned edge (16) is designed to be placed in the receptacle (1) with the edge (16) resting on the ledge (5). Articles of food placed in this pan may be cooked by steam, owing to the perforated bottom.

When it is desired to employ the cooker to stew vegetables etc., the pan (14) can be removed, and in its stead a flat oval disk (17) provided with a centrally arranged circular aperture (18) and steam holes (19) may be placed in the receptacle (1) with its outer edge resting on the ledge (5).

A deep round pan (20), which is provided with sides (21) slanting outwardly from the bottom up, has its top edge turned over to form a rim (23). This pan is adapted to be supported in the aperture (18) by its slanting sides resting on the edges thereof. The pan will also prove useful in cooking rice, and other cereals as steam will rise through the perforations (19) and keep the rice or cereal moist, thereby avoiding the necessity of stirring while cooking. In order to turn the pan (20) into a tubed cake pan a flat circular disk (24) provided with a central, hollow truncated cone portion (25) is placed therein. In order to bake bread in the pan (20) the disk (24) provided with the hollow truncated cone portion (25) can be removed, if desired. With the disk and cone portions removed it can, of course, also be used as a cake pan.

When it is desired to cook eggs, muffins or other small articles, the disk (17) can be removed with the pan (20), and an oval disk (26) provided with circular apertures (27), preferably six in number, arranged around a smaller central aperture (28) is put in its place. Into the apertures (27) are designed to fit cups (29) formed with rounded bottoms, as shown, or cups of the form designated by the numeral 30. As will be apparent, it is not necessary that the disk (17) and the pan (20) be removed when it is desired to use the disk (26) and cups (29) or (30), for if anything is cooking in the pan (20), the disk and cups would not interfere with it. Articles could also be cooked in the cups (30) by placing them on the disk (12) at the bottom of the receptacle (1).

On opposite sides of the receptacle (1) are pivotally connected ears (31), (31), which are so attached that the groove (4) forms a half bearing for the pivots thereof, while pieces of sheet metal (32), (32), each provided with a groove (32ª) are so secured as to form the other half of the bearing. Each ear is so shaped at the top as to form a loop (33). A handle (34) has its ends so bent as to form a hook (35) at each end thereof. The handle, it will be noted, can be readily hooked and unhooked from the loops (33) of the ears.

Referring to Fig. 1, it will be seen, that when not in use, the various parts of the cooker can all be so packed in the receptacle (1) that the cover (8) can be placed thereon. On the bottom disk (12) can be placed the six cups of the type designated by the numeral (30). The deep pan (14) can then be placed in position, and then the disk (17) with the pan (20) supported in the central aperture (18). In the pan (20) is placed the disk (24) with the tube portion (25), and then the disk (26) can be placed thereon with the top of the tube projecting through the central aperture (28), when the cups (29) with rounded bottoms can be placed in the circular apertures (27) and the cover (8) can then be placed in position.

As will be readily apparent, the various utensils described in connection with my cooker can be arranged in a variety of combinations to suit the needs of the person using the same.

What I claim is:—

1. In a cooker, a main receptacle having a projection or ledge formed on its interior adjacent to the top and its sides slanting inwardly above said ledge, a deep pan suspended in the upper part of the main receptacle and having a perforated bottom and an outwardly curved flange on its upper edge, resting on and fitting over the ledge on the main receptacle, a disk apertured for the support of cooking utensils, and the passage of steam, said disk resting on the curved flanged edge of the pan, a deep pan extending through said disk and resting on the bottom of the first-mentioned deep pan, there being a space between the sides of said pans, and a cover having depending sides sprung into frictional engagement with the inwardly slanting sides of the main receptacle at its top, and resting on said disk, there being a space between the top of the second deep receptacle and the top of the cover.

2. In a cooker, a main receptacle having a projection or ledge formed on its interior adjacent to the top, and its sides slanting inwardly above said ledge, a deep pan suspended in the upper part of the main receptacle, and having a perforated bottom, and an outwardly curved flange on its upper edge resting on and fitting over the ledge on the main receptacle, a disk apertured for the support of cooking utensils, and the passage of steam, said disk resting on the curved flanged edge of the pan, a deep pan extending through said disk, and resting on the bottom of the first-mentioned deep pan, there being a space between the sides of said pans, a disk resting on the top of the second deep pan and having a central aperture, and a number of apertures for supporting culinary vessels, a flat disk with a central truncated cone located in the second deep pan and having the cone projecting through the said apertured disk, and a cover with depending sides held in frictional engagement with the slanting side portions of the main receptacle, and resting on the first-mentioned perforated disk.

3. In a cooker, the combination of a primary receptacle provided with a continuous groove formed in the outer faces of the sides, said groove producing a continuous horizontal shoulder extending into the receptacle, said receptacle provided above the shoulder with a portion constituting an overhanging edge or flange having a bead, an article-supporting disk resting upon the shoulder, and a cover provided with a depending flange having a continuous beaded edge, said beaded edge adapted to be passed down into the receptacle within the upper portion and engaging the article-supporting disk for clamping the same against the shoulder, the depending flange of the cover being provided with a continuous socket-flange upon its outer face and the beaded upper edge of the primary receptacle normally engaging said socket, whereby the beaded edge of the receptacle and the cover constitute an interlocking fastening-device for securing the cover and article-supporting member in an assembled position.

In testimony whereof I hereunto affix my signature in presence of two witnesses.

GEORGE G. FOX.

Witnesses:
M. E. SHAW,
J. S. WILLIAMS.